United States Patent
Hinkley

(10) Patent No.: US 7,222,487 B1
(45) Date of Patent: May 29, 2007

(54) PORTABLE ELECTRICITY GENERATING GRAVITY DRIVEN WHEEL SYSTEM

(76) Inventor: William G. Hinkley, 783 Westfield Dr., Cinnaminson, NJ (US) 08077

(*) Notice: Subject to any disclaimer, the term of this patent is extended or adjusted under 35 U.S.C. 154(b) by 0 days.

(21) Appl. No.: 11/372,938

(22) Filed: Mar. 10, 2006

(51) Int. Cl.
*F03B 7/00* (2006.01)
*H02P 9/04* (2006.01)

(52) U.S. Cl. .......................... 60/639; 290/43
(58) Field of Classification Search .................. 60/398, 60/639; 290/43, 54; 415/916
See application file for complete search history.

(56) References Cited

U.S. PATENT DOCUMENTS

| | | | | |
|---|---|---|---|---|
| 224,299 A * | 2/1880 | Leininger | ..................... | 60/639 |
| 2,167,493 A * | 7/1939 | Sutcliff | ........................ | 417/329 |
| 3,984,698 A * | 10/1976 | Brewer | ........................ | 60/639 |
| 3,987,307 A * | 10/1976 | Giconi | ......................... | 290/42 |
| 4,246,753 A * | 1/1981 | Redmond | ..................... | 60/398 |
| 4,260,902 A * | 4/1981 | Crider | .......................... | 60/398 |
| 5,243,224 A * | 9/1993 | Tagney, Jr. | .................. | 290/1 R |
| 5,252,859 A * | 10/1993 | Tagney, Jr. | .................. | 290/1 R |
| 5,755,553 A * | 5/1998 | Laemthongsawad | ......... | 60/398 |
| 5,905,312 A * | 5/1999 | Liou | ........................... | 60/639 |
| 6,029,688 A * | 2/2000 | Kaufman | ..................... | 137/99 |
| 6,246,125 B1 * | 6/2001 | Axtell | ......................... | 290/43 |
| 6,644,937 B2 * | 11/2003 | Han | ............................ | 60/398 |
| 6,981,376 B2 * | 1/2006 | Dutta | .......................... | 60/639 |
| 2001/0024038 A1 * | 9/2001 | Cavalheiro | .................. | 290/1 R |
| 2003/0127860 A1 * | 7/2003 | Baron | ......................... | 290/43 |

* cited by examiner

*Primary Examiner*—Thomas E. Lazo
(74) *Attorney, Agent, or Firm*—Donald W. Meeker

(57) ABSTRACT

A wheel assembly with tangentially attached fluid receptacles around the perimeter rotates to power a gravity driven fluid electricity generating assembly. A plunger pump assembly with a drive wheel powered by the wheel assembly pumps a quantity of fluid to fill a fluid receptacle with each motion of a lever arm eccentrically attached to the drive wheel.

1 Claim, 2 Drawing Sheets

US 7,222,487 B1

PORTABLE ELECTRICITY GENERATING GRAVITY DRIVEN WHEEL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to electricity generating systems and particularly to a portable self-powered gravity driven wheel generating system in which water, particulates, or other fluid matter are pumped by a wheel driven plunger rod assembly through a pipe for delivery to the top of the rotatable wheel to turn the wheel to activate an electricity generator.

2. Description of Related Art Including Information Disclosed Under 37 CFR 1.97 and 1.98

Fossil fuels are presently being used in tremendous quantities throughout the world. The supply of such fuels, particularly oil and natural gas, may be depleted within the twenty first century, while the cost of these fuels has risen several drastically in the last ten years. Coal is more plentiful, and presently less expensive than our oil or natural gas, but problems exist with pollutants from the burning thereof. Power from nuclear fission is relatively expensive because of the initial outlays for power plant construction; and difficulties arise in handling the waste products from this source of power. The generation of power from solar energy has recently stirred a great deal of interest, but presently, solar power producing units are extremely expensive to install relative to the amount of useful power obtained; and solar power is less useful in northern climates. Major sources of hydro-electric power have already been tapped in the United States, with only minor sources left for exploitation.

Current-driven, power-generating waterwheels which are permanently built in or floated upon a moving body of water are well known in the art. Prior art does not provide a waterwheel driven system for generating electricity which can be placed in any desired location.

U.S. Patent Application #20030127860, published Jul. 10, 2003 by Baron, is for a recirculating hydroelectric power generation system. The system includes a reservoir and at least one confinement column connected, and open to the reservoir at the base of the at least one confinement column. A source of pressurized air is provided and means for delivering the air to an air diffuser located near the base of the at least one confinement column. A guide chute is located at the top of the at least one confinement column in such a way that water exiting the top of the at least one confinement column is directed to a waterwheel or turbine, said waterwheel or turbine being operably connected to an electric generator unit.

U.S. Patent Application #20010024038, published Sep. 27, 2001 by Cavalheiro, provides a pendulum pumping device, which has an upright support with a fulcrum at its top. A pendulum beam is pivotally mounted to the fulcrum for pivoting about a horizontal axis. The beam has first and opposite second ends. A U-shaped pipe for containing a liquid such as water, has first and second upturned ends. An overflow pipe and tank and a return pipe and return section receive and hold liquid from the U-shaped pipe. A piston slides in the first end of the U-shaped pipe. The piston is connected to the first end of the pendulum beam for moving up and down with pivoting of the beam. A weight helps force the piston down to push liquid up into the overflow pipe and to the return section. A pair of pivoting, initially spread and weighted wings at the second end of the beam, pivot out to a parallel extended position by the action of a small motor, to increase their effective weight and to thus push down on the second end of the beam for pulling the piston up. Valves allow liquid to return to the U-shaped pipe from the return section. The wings then spread out to reduce their effective weight on the second end of the beam and the cycle repeats. A turbine or water-wheel can be provided in the overflow tank and rotate when it is supplied with liquid from the overflow pipe. This rotation can be for amusement or the turbine can be connected to a small generator to generate some electricity, again for amusement.

U.S. Pat. No. 3,984,698, issued Oct. 5, 1976 to Brewer, describes a waterwheel driven electrical generator system. The waterwheel apparatus as a plurality of pivoted buckets mounted in circumferentially spaced relation around a central hub and having an outer rim provided with a ring gear driving a pinion gear on the generator shaft for obtaining a high rotational speed in a generator from a relatively slow turning waterwheel. The waterwheel buckets each fold outwardly to hold a maximum quantity of water as the bucket reaches approximately the horizontal center line of the wheel on the downwardly moving side of the wheel while each bucket empties at the vertical center line of the wheel as the bucket passes the bottom side and thereafter folds inwardly as the bucket moves upwardly and over the top of the wheel.

U.S. Pat. No. 4,260,902, issued Apr. 7, 1981 to Crider, shows a fluid driven rotary engine of the water wheel type comprising a spoked water wheel rotatably mounted on a hollow stationary axle and having a set of water collection containers supported on the outer ends of hollow hub-mounted wheel spokes. Water or other liquid is delivered under pressure or an available head to the interior of the axle and from there through the hollow spokes and nozzles at the ends of the spokes into the containers to impart rotation to the water wheel. The water wheel unit may be equipped with an alternator or generator which is drive connected to hub by suitable means such as a belt and pulley assembly or transmission gearing. The alternator is thereby driven by rotation of the water wheel to generate electricity.

Two U.S. Pat. No. 5,252,859 issued Oct. 12, 1993 and U.S. Pat. No. 5,243,224 issued Sep. 7, 1993 both to Tagney, Jr., provide a jogging electric current generator which comprises a drum-shaped rotatable exercising unit operatively connected to an electric current generator. The drum-shaped unit is constructed so that a jogger can enter the unit and jog for purposes of exercising and also simultaneously therewith generate an electric current through operation of the generator. The drum-shaped unit may also be constructed so as to operate as a water vane with water being moved during the jogging activity. A pumping mechanism is provided for pumping water to a trough located above the drum-shaped housing. The water spills into the slots between each of the vanes. The water is allowed to flow out of the slots through elongate openings on the sides of each of the slots. Thereafter, the water is collected into a sump and recycled to perform a continuous operation. The jogging generator is also constructed so that a plug in connector can be operatively connected to the generator. Further, the electric power generated by using this jogging generator can be used for charging storage batteries or the like.

U.S. Pat. No. 6,246,125, issued Jun. 12, 2001 to Axtell, claims a portable generating system for converting either water or wind energy into electricity comprises a paddle wheel assembly having a housing and a plurality of impellers rotatably mounted therein. The housing defines inlet and outlet openings for receiving a fluid stream, whether water or air, therebetween so as to rotate the impellers. The impellers are axially connected to a generator for producing electricity upon impeller rotation as the fluid stream flows between the housing openings. The generator may be mounted within the paddle wheel housing adjacent the impellers or at a distance therefrom and coupled thereto with a shaft. A plurality of mounting brackets are fixedly attached to the outer surface of the housing. The generating system further includes a plurality of height-adjustable support legs that may be coupled to the mounting brackets so that the paddle wheel housing may be positioned at a predetermined height above a support surface. The support surface may be a dry ground area such that electricity is generated as a result of an air stream or may be a body of water such that electricity is generated as a result of a water stream. The system may easily be assembled and disassembled and moved between desired locations.

U.S. Pat. No. 3,987,307, issued Oct. 19, 1976 to Giconi, is for a system for generating electrical energy by dropping particulate material down a shaft and directing the falling particulate matter into buckets around the periphery of a large wheel, similar to a "water wheel". The wheel turns as a result of the transference of kinetic energy from the falling particulate matter to the wheel and the unbalanced weight of particulate matter on the wheel. The hub of the wheel is coupled to an electrical generator.

What is needed is a portable system for generating electricity using a gravity fluid driven generator wheel and pumped fluids to drive the wheel.

BRIEF SUMMARY OF THE INVENTION

An object of the present invention is to provide portable completely self-sufficient system for generating electricity using a gravity driven rotatable wheel hitched to a generator and pumped fluids to drive the waterwheel.

In brief, a pump sits in a tank of water or other fluid under the liquid level and pushes down through a U to force liquid up to the top of the wheel and discharge a precise amount of fluid to a bucket on the wheel rim to turn the wheel. The bucket then empties back into the tank when it reaches the bottom of the wheel and begins an upward motion with the bucket inverted to empty the bucket.

The wheel is a large diameter free wheeling perfectly round double wheel, with two wheels side by side running on the same axis to balance weight for a smooth rotation. Buckets are mounted in an evenly spaced array around the rim of the double wheel between the two wheels for even balance for a smooth rotation. The buckets are bucket to bucket so as the wheel turns so that when liquid stops entering one bucket, it immediately starts to fill the next bucket. The continual filling of the buckets with fluid on one side of the wheel and the dumping out of the fluid as each bucket passes the bottom and starts up to twenty-five degrees or thirty-seven and a half minutes as viewed on a circular clock the other side in an inverted position keeps the wheel rotating due to the pull of gravity on the full buckets, plus momentum to degree approximately two-hundred-twenty-five degrees from the top or thirty-seven and a half minutes on a circular clock face before emptying.

The large wheel with the buckets turns two small wheels driven by contact or teeth. One will be adjusted to make the fulcrum of the pump stroke exactly to the right amount of liquid for the next bucket. The other wheel driven by contact or teeth is a small wheel connected to a larger small wheel that it spin faster (this will be the armature of a generator an alternator.

Magnetic fields will be formed by stationary magnets surrounding the last wheel and thus sending out electrical current.

The system can be used with any fluid including water, antifreeze, milk, soup, sand, pellets, mercury, or oil.

An advantage of the present invention is that it is a self sufficient system for generating electricity which may be set up anywhere to generate electricity after the initial set up.

Another advantage of the present invention is that the rotating gravity fluid driven wheel provides a pumping action to pump fluids to the top of the wheel to turn the wheel and the motion of the wheel activates an electricity generator.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
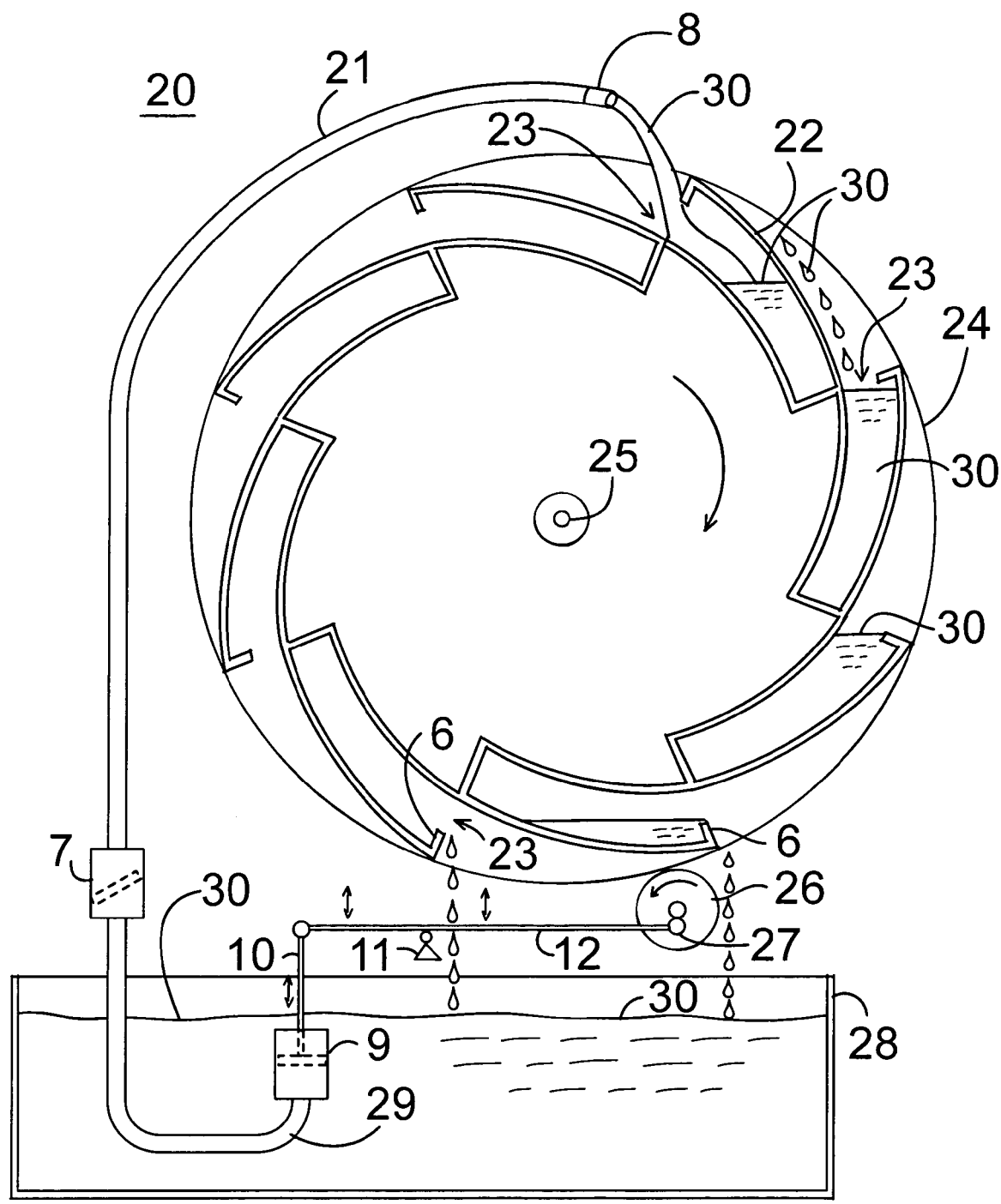
FIG. 1 is an elevational view in partial section of the gravity driven wheel assembly of the present invention showing the plunger pump assembly and fluid conduit for filling the series of fluid receptacles on the wheel assembly to cause rotation of the wheel assembly.
Figure 2:
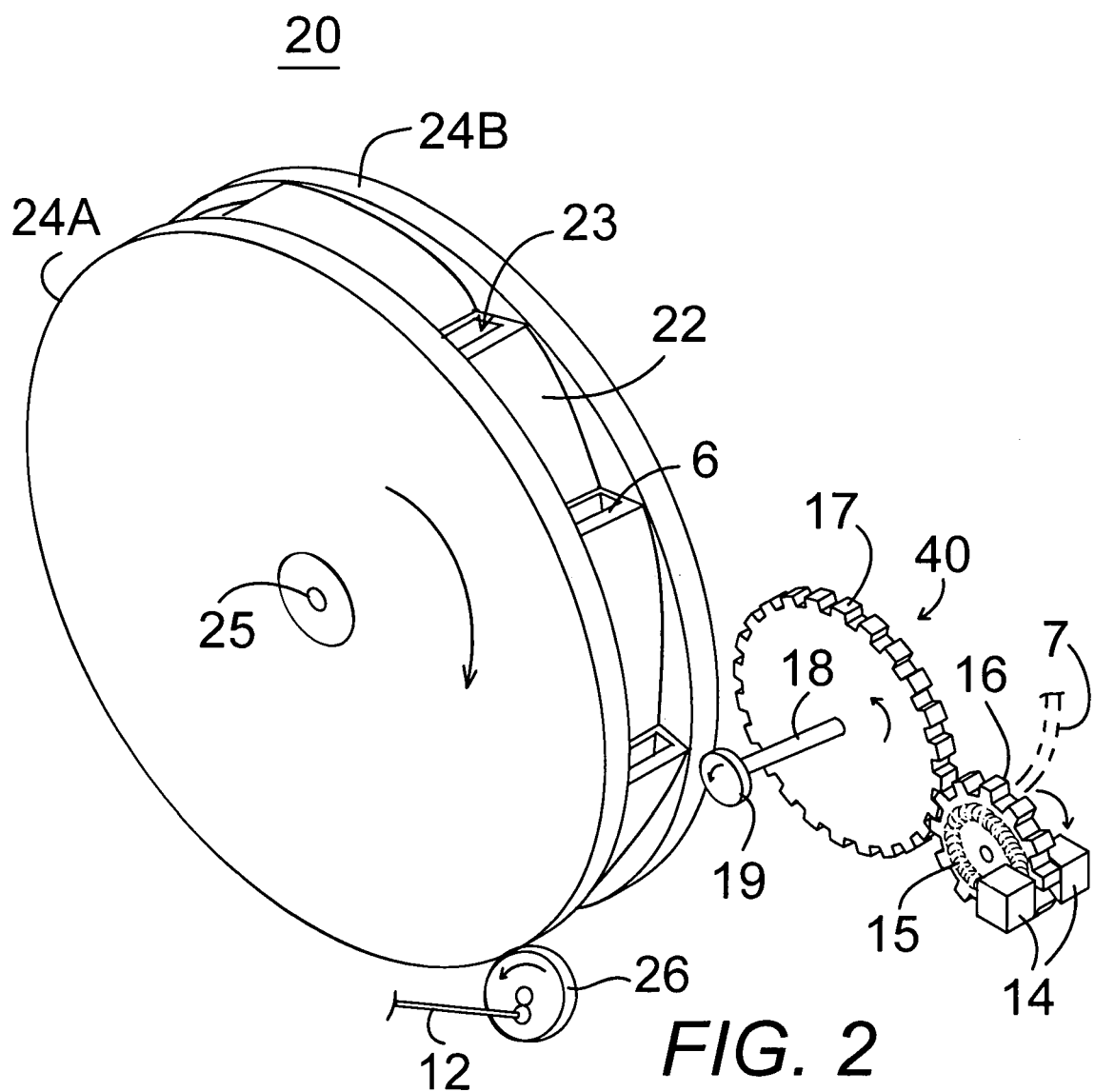
FIG. 2 is a perspective view showing the two balanced wheels of the wheel assembly and the electricity generating assembly contacting the wheel assembly.

In FIGS. 1 and 2, a gravity driven wheel system 20 for generating electricity comprises a series of fluid receptacles 22 mounted around a perimeter of a wheel assembly 24 rotational about a center axle 25.

The double wheel assembly 24 comprises two identical wheels 24A and 24B spaced apart mounted in a vertical orientation on a horizontal axle 25 with a low friction pivoting connection. The two wheels are balanced evenly relative to the horizontal axle 25 for a smooth rotation about the horizontal axle.

A series of struts 13 are evenly spaced around the perimeters of the two wheels, between the two wheels interconnecting the two wheels 24A and 24B. A series of fluid receptacles 22 are all mounted to the struts 13 and the wheels 24A and 24B in an equal spaced array between the two wheels 24A and 24B adjacent to the perimeters of the wheels. Each of the fluid receptacles has a single opening 23 for admitting a fluid 30 into the fluid receptacle 22 with the fluid receptacle in an upright position on the right side of the wheel assembly as shown in FIG. 1, and the single opening 23 allowing fluid to flow out of the fluid receptacle 22 with the fluid receptacle in an inverted position on the left side of the wheel assembly as shown in FIG. 1.

The fluid receptacles 22 are mounted tangentially to the wheels 24A and 24B with all of the openings oriented in the same direction so that a measured quantity of fluid 30 poured into a series of the fluid receptacles 22 adjacent to a top of the wheel assembly 24 causes rotation of the wheel assembly due to the weight of the full fluid receptacles 22 on a first side, the right side of FIG. 1, of the rotating wheel assembly 24 and the fluid receptacles 22 empty out adjacent to the bottom of the wheel assembly as the fluid receptacles 22 tip to allow the fluid to pass out of the openings 23 leaving all empty fluid receptacles on the second side, the left side in FIG. 1, of the wheel assembly 24 so that the weight of the full fluid containers 22 on the first (right) side causes a rotation of the wheel assembly 24. A lip or flap 6 on an outer edge of the single opening 23 of each of the fluid receptacles 22 delays emptying of the fluid receptacle at the bottom of the wheel 24 to provide maximum momentum from the weight of the fluid on one side of the wheel.

In FIG. 1, one or more fluid pumping plunger assemblies 29 each comprise at least one plunger pump 9 immersed in a fluid 30 in a tank 28 (which may be a swimming pool or any large container for fluids, located below the wheel assembly 24 to receive the fluid 30 dumped back out of the fluid receptacles 22 as they tip with the rotation of the wheel assembly 24. A lever arm 12 mounted on a fulcrum point 11 drives the plunger pump 9 through a vertical arm 10 at one end of the lever arm 12. At least one plunger assembly wheel 26 contacts the wheel assembly 24 by a high friction surface or gear system so that a rotation (as indicated by the arrow) is imparted to the plunger assembly wheel 26 in response to the rotation of the wheel assembly 24.

A first end of the lever arm 12 is attached to the at least one plunger assembly wheel by an eccentric pivotal connection 27 so the first end of the lever arm pivots up and down (as indicated by the double arrow) in response to the rotation of the plunger assembly wheel 26 on a first side of the fulcrum point 11 so that a second end of the at least one lever arm pivots up and down (as indicated by the double arrow) moving a vertical arm 10 up and down on a second side of the fulcrum point (as indicated by the double arrow) to drive the plunger pump 9.

At least one fluid conduit 21 is attached between the plunger pump 9 and at least one fluid spout 8 adjacent to a top of the wheel assembly positioned above the opening 23 in each of the fluid receptacles 22 to fill each of the fluid receptacles 22 on the wheel assembly 24 as the opening 23 in the fluid receptacle 22 passes under the at least one fluid spout 8. The fluid conduit 21 is attached to the at least one plunger pump 9 by a one-way flapper valve 7, and the plunger pump 9 and the fluid conduit 21 are configured so that each motion of the lever arm 12 pumps a specific quantity of fluid 30 into the fluid conduit 21 to fill a fluid receptacle 22 on the wheel assembly 24 through the fluid spout 8 and the flapper valve 7 prevents flow of the fluid in the fluid conduit back into the plunger pump.

In FIG. 2, an electricity generating assembly 40 comprises at least one armature 15, such as a wire coil, which may be attached to or imbedded in a gear 16, is rotatable between at least one pair of magnets 14 to create an electric current in the at least one armature and at least one generator drive wheel 19 connected to the armature by a means, such as a generator axle 18 to cause a rotation (is indicated by the arrow) of the armature 15 between the magnets 14. The generator drive wheel 19 contacts the wheel assembly 24 by a high friction surface or gear mesh connection so that the rotation of the wheel assembly 24 (as indicated by the arrow) causes the generator drive wheel 19 to create a rotation of the armature 15 to generate an electric current in the armature 15.

An electric cable 7 or wire or other means conducts the electric current away from the at least one armature 15 for use of the electric current.

The parts of the system 20 can be varied in size to adjust the speed of the moving parts and the amount and power of the electricity produced. A variety of types of fluid may be used in the system including water, water with antifreeze, milk, soup, oil, granules such as sand, mercury or other fluid.

The larger big wheel gives more speed to the armature. Thus a twenty-five foot wheel would be more efficient than a fifteen foot wheel. An approximate estimates expect a twenty-five foot wheel to supply one house with sufficient electricity for normal usage per day.

It is understood that the preceding description is given merely by way of illustration and not in limitation of the invention and that various modifications may be made thereto without departing from the spirit of the invention as claimed.

What is claimed is:

1. A gravity fluid driven wheel system for generating electricity, the system comprising:

a double wheel assembly comprising two identical wheels spaced apart mounted in a vertical orientation on a horizontal axle with a low friction pivoting connection, the two wheels balanced evenly relative to the horizontal axle for a smooth rotation about the horizontal axle; a series of struts evenly spaced around the perimeters of the two wheels, between the two wheels interconnecting the two wheels; a series of fluid receptacles each having a single opening for admitting a fluid into the fluid receptacle with the fluid receptacle in an upright position and the single opening allowing fluid to flow out of the fluid receptacle with the fluid receptacle in an inverted position, the fluid receptacles all mounted to the struts in an equal spaced array between the two wheels adjacent to the perimeters of the wheels, the fluid receptacles mounted tangentially to the wheels with all of the openings oriented in the same direction so that a measured quantity of fluid poured into a series of the fluid receptacles adjacent to a top of the wheel assembly causes rotation of the wheel assembly due to the weight of the full fluid receptacles on a first side of the rotating wheel assembly and the fluid receptacles empty adjacent to the bottom of the wheel assembly as the fluid receptacles tip to allow the fluid to pass out of the openings leaving all empty fluid receptacles on the second side of the wheel assembly so that the weight of the full fluid receptacles on the first side causes a rotation of the wheel assembly;

at least one fluid pumping plunger assembly comprising at least one plunger pump immersed in a fluid; at least one lever arm mounted on a fulcrum point for driving the at least one plunger pump; at least one plunger assembly wheel contacting the wheel assembly so that a rotation is imparted to the at least one plunger assembly wheel in response to the rotation of the wheel assembly; a first end of the at least one lever arm attached to the at least one plunger assembly wheel by an eccentric pivotal connection so the first end of the lever arm pivots up and down in response to the rotation of the at least one plunger assembly wheel on a first side of the fulcrum point so that a second end of the at least one lever arm pivots up and down to drive the at least one plunger pump on a second side of the fulcrum point; at least one fluid conduit attached between the plunger pump and at least one fluid spout adjacent to a top of the wheel assembly positioned above the opening in each of the fluid receptacles to fill each of the fluid receptacles on the wheel assembly as the opening in the fluid receptacle passes under the at least one fluid spout, the at least one fluid conduit attached to the at least one plunger pump by a one-way flapper valve, the at least one plunger pump and the fluid conduit configured so that each motion of the at least one lever arm pumps a specific quantity of fluid into the at least one fluid conduit to fill a fluid receptacle on the wheel assembly through the at least one fluid spout and the flapper valve prevents flow of the fluid in the fluid conduit back into the plunger pump;

an electricity generating assembly comprising at least one armature rotatable between at least one pair of magnets to create an electric current in the at least one armature and at least one generator drive wheel connected to the at least one armature by a means to cause a rotation of the at least one armature between the at least one pair of magnets, the at least one generator drive wheel contacting the wheel assembly so that the rotation of the wheel assembly causes the at least one generator drive wheel to create a rotation of the at least one armature to generate an electric current in the at least one armature; and a means for conducting the electric current away from the at least one armature for use of the electric current.

* * * * *